United States Patent [19]

Jackson

[11] 3,967,637
[45] July 6, 1976

[54] APPARATUS FOR DEAERATING FLUIDS

[75] Inventor: George James Jackson, Peoria County, Ill.

[73] Assignee: Caterpillar Tractor Co., Peoria, Ill.

[22] Filed: Apr. 11, 1975

[21] Appl. No.: 567,170

Related U.S. Application Data

[62] Division of Ser. No. 525,538, Nov. 20, 1974.

[52] U.S. Cl. ............................... 137/110; 137/117; 137/183; 137/588; 137/567
[51] Int. Cl.² ......................................... F16K 24/00
[58] Field of Search ........... 137/183, 199, 117, 116, 137/588, 110, 567

[56] References Cited
UNITED STATES PATENTS
3,575,192   4/1971   MacDuff .............................. 137/116
3,625,240   12/1971   MacDuff ......................... 137/117 X

*Primary Examiner*—Alan Cohan
*Attorney, Agent, or Firm*—Phillips, Moore, Weissenberger, Lempio & Strabala

[57] ABSTRACT

A deaeration valve useful in a pressurized fluid system for reducing the transfer of air from a sump to the principal reservoir of the system is disclosed. The valve comprises a body including a bore longitudinally therethrough and a poppet-type spool slidably disposed in the bore. An orifice is axially-disposed in the end of the valve spool which is adapted to fit in the seat end of the bore. Air escapes through the orifice when an inadequate amount of fluid pressure is exerted against the orifice end of the spool to force the spool significantly away from the seat. When the spool is forced significantly away from the seat, fluid flow proceeds through a hole which communicates with the bore adjacent the seat. The spool is biased by a spring or the like against the seat, so that the pressure due to the fluid must build up to a significant value before the spool will be forced away from the seat and the hole will be open to fluid flow. Means are provided for venting air from the primary reservoir of the system into the bore of the valve through a passageway in the spool and therefrom into a secondary sump.

2 Claims, 1 Drawing Figure

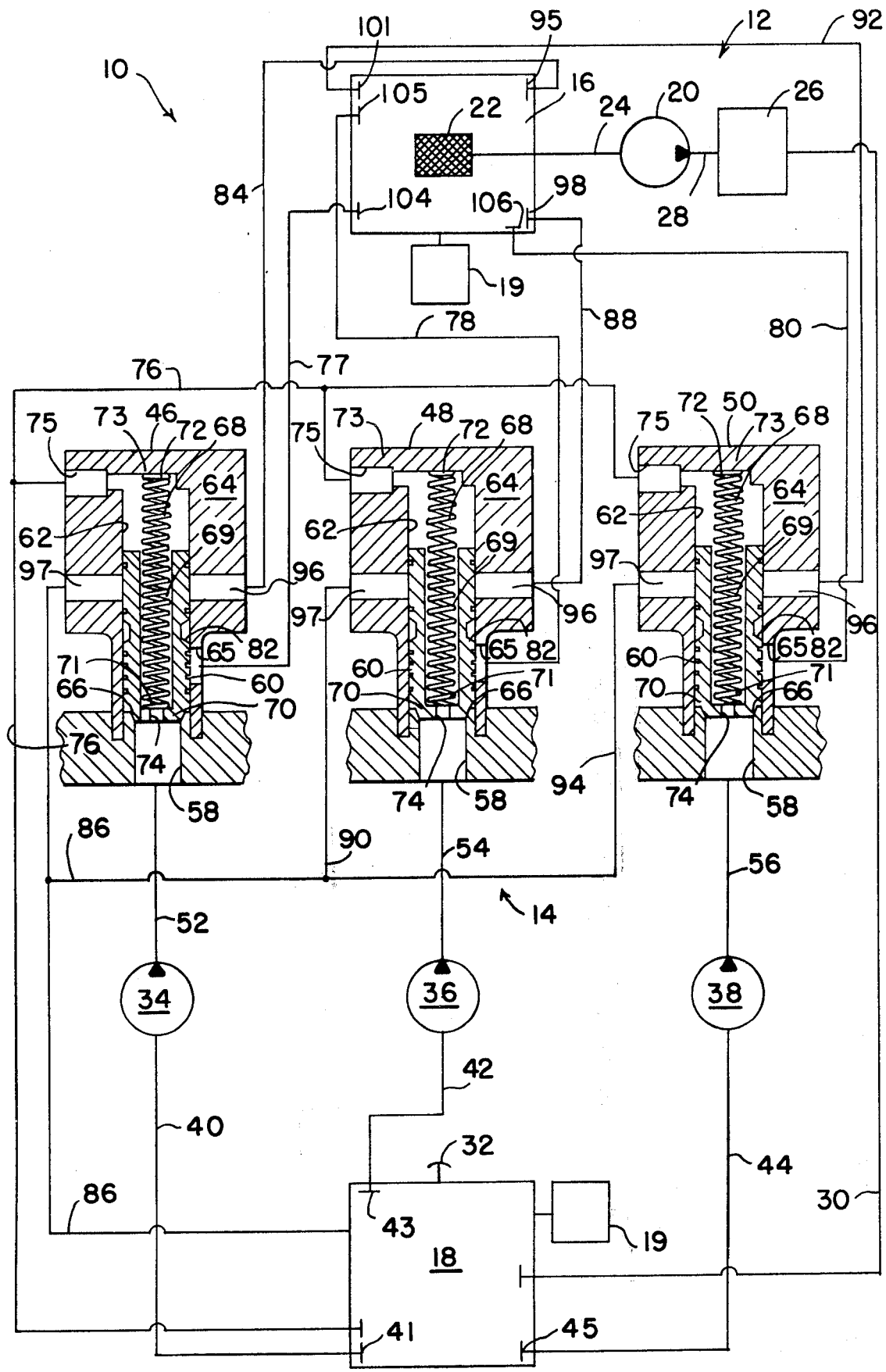

APPARATUS FOR DEAERATING FLUIDS

This is a division of Ser. No. 525,538, filed Nov. 20, 1974.

BACKGROUND OF THE INVENTION

The invention relates to a deaeration and vent valve useful in association with a pressurized fluid-communicating system for reducing the amount of air delivered from a pump to a primary reservoir of the system, and a vent means for maintaining the primary reservoir substantially full of fluid.

Air contamination of hydraulic fluids is a common problem in the hydraulics fields. Deaeration means presently used include filters, specially-baffled tanks, and air-bleed valves. These devices are satisfactory for typical hydraulic systems, wherein the amount of agitation of the hydraulic fluid is kept to a minimum. New lines of earth-moving equipment, however, have more active hydraulic systems which have a tendency to cause a greater amount of aeration. Further, these new lines of earth-moving products and more extensive hydraulic systems are often required to operate at angles from the horizontal substantially greater than those encountered by previous earth-moving products.

Accordingly, it is an object of the present invention to provide a deaeration and vent valve which, when used in association with a pressurized fluid-communicating system, substantially reduces the amount of air delivered to the primary reservoir of this system, even when the system is operated at substantially large angles from the horizontal.

SUMMARY OF THE INVENTION

In one aspect, the invention comprises a valve adapted for use in a pressurized fluid flow system to reduce the transfer of air into the primary reservoir of the system. The valve comprises a body including a bore longitudinally therethrough ending in a seat adjacent one end thereof, a port communicating the other end of said bore with the exterior of said body, a hole through said body communicating with said bore intermediate said port and said seat, and a fluid flow entrance communicating with said seat. The valve further comprises a poppet-type spool slidably disposed in said bore, one end of said spool being adapted to sit against said seat, said spool including a restricted orifice communicating said one end thereof with said bore. The valve also includes means for biasing said one end of said spool to sit against said seat. The entrance of the body is adapted to receive fluid flow including entrapped air from a pressurized fluid-flow system upstream of the valve and to direct said pressurized flow against said one end of said spool in opposition to the force exerted by said biasing means. The orifice is adapted to conduct air and fluid therethrough into said bore and out of said port, and therefrom into said system upstream flow-wise of said valve when said spool is not displaced against the force exerted by said biasing means sufficiently to allow said fluid to flow along said bore and out said hole. The hole is adapted to conduct said fluid therethrough when said spool is displaced by the force of said flow acting against the force of said biasing means sufficiently to allow said fluid to flow along said bore, and out said hole and therefrom to said reservoir.

In another aspect, the invention comprises a lubricating system including means for reducing the amount of air contamination therein. The system includes a non-vented primary reservoir and a vented sump adapted to receive fluid pumped from said reservoir. Means are provided for mounting said reservoir and said sump to a frame in a rigidly-fixed relationship to one another. A plurality of the above-described valves downstream flow-wise of said sump and upstream flow-wise of said reservoir form a part of the system. Means are provided for each valve communicating the bore with the sump, the opening with the reservoir, the hole with the reservoir, and the entrance with the sump. The entrance-sump communicating means of the valves terminate at spaced-apart regions of the sump. The opening-reservoir communicating means of the valves terminates at spaced-apart regions of the reservoir. As a result, irrespective of the rotation of the frame, at least one of the valves is directing fluid flow from the sump to the reservoir and directing air entrapped in the reservoir to the sump.

BRIEF DESCRIPTION OF THE DRAWING

A number of aspects and objects of the invention will become apparent from the following description and the accompanying drawing wherein:

FIG. 1 illustrates the lubricating system of the present invention in block diagram form and further illustrates the valve of the present invention in side-section.

DETAILED DESCRIPTION OF THE PREFERRED EMBODIMENT

FIG. 1 illustrates the hydraulic lubricating system 10 comprising a primarily fluid-direction system 12 and a secondary fluid-scavenging system 14. A primary fluid reservoir 16 and a secondary sump 18 are each rigidly affixed to a single frame 19, e.g., the frame of an earth-moving machine, represented diagrammatically, in rigidly-fixed relationship to one another. Because of the rigid affixing of the reservoir relative to the sump, when the frame is rotated both the reservoir and the sump are also rotated, but are rotated together, thereby always maintaining the same spatial relationship to one another.

In the primary fluid-directing system 12, fluid is drawn from the reservoir 16, which is a closed reservoir, by a pump 20 through a filter 22 via a conduit 24 and therefrom onto bearing surfaces represented diagrammatically by a box 26 via a conduit 28 where the fluid serves to maintain a film of oil on the bearing surfaces to reduce wear and establish adequate bearing life. The fluid exits the bearing surfaces via a conduit 30 and is conducted thereby to the secondary sump 18. The secondary sump is vented to the atmosphere via a conventional vent 32, as illustrated schematically.

The secondary fluid-scavenging system 14 returns the fluid from the secondary sump 18 downstream therefrom to the primary reservoir 16, thereby maintaining an adequate level of fluid in the primary reservoir for lubrication purposes. Fluid is drawn from the sump via a plurality of pumps 34, 36 and 38 through a plurality of conduits 40, 42 and 44, respectively. A plurality of pick-ups 41, 43 and 45 associated with the conduits 40, 42 and 44, respectively, are located at spaced-apart regions of the sump. In the particular embodiment illustrated, the pick-ups are at different corners of the sump. This is important, since it provides that no matter what the rotation of the frame 19 to which the sump is attached, at least one of the pick-ups is immersed in fluid, so that fluid is always being returned by the secondary fluid-scavenging system 14 to the lubricating system 10. The placement of the pick-ups also assures, as will become apparent from the following, that any air entrapped in the primary reservoir is returned therefrom via the valve whose pick-up is immersed in fluid to the sump.

The sump 18 is made to be larger in volume than the primary reservoir 16, and is not completely full of fluid, so that any one of the pick-ups 41, 43 and 45 associated respectively with the conduits 40, 42 and 44 may be drawing air and/or a combination of air and oil. This creates the need for a plurality of deaeration valves 46, 48 and 50. These valves are located upstream flow-wise of the reservoir and downstream flowwise of the sump. Fluid and/or air enter a fluid-flow entrance 58 of the valves. A poppet-type spool 60 is slidably disposed in a bore 62 of a valve body 64. The valve body has a hole 65 passing from the bore to the exterior thereof. The spool 60 is biased against a seat 66 of the body, the seat 66 being adjacent one end of the bore. The hole is located adjacent the seat of the body. Biasing means for biasing the spool against the seat is provided by a spiral spring 68 which sits within a well 69, said well being formed longitudinally within said spool and terminating adjacent one end 70 thereof. One end 71 of the spiral spring terminates against the bottom of the well. The other end 72 of the spiral spring terminates against an end wall 73 of the bore. The spool remains in abutment with the seat until the fluid pressure in the entrance is adequate to overcome the force of the spring. An orifice 74, axially-disposed in the spool, communicates fluid and/or air to the bore via the well and therefrom out of the valve via a port 75. The well thus serves both the function of properly holding the spring, and the function of allowing flow therethrough and into the bore. Until there is adequate pressure in the entrance, the spool remains against or very closely adjacent the seat and only a small amount of fluid and air is permitted to pass through the constricted orifice. When the fluid contains a substantial amount of air, there is not enough pressure to unseat the spool. In this case, the air exits via the port and returns to the secondary sump via a conduit 76.

When any of the three pumps 34, 36 and 38 is pumping a substantial amount of fluid, pressure builds up against the one end 70 of the spool 60, which is considerably larger than the orifice 74, and causes any combination of the three valves 46, 48, and 50 to unseat significantly and communicate primarily fluid flow to the primary reservoir 16 via the hole 65 and the conduits 77, 78 and 80 respectively.

The passageway 82, which in the preferred embodiment illustrated comprises an annular groove in spool 60 of valves 46, 48 and 50, serves to vent the primary reservoir 16 to the vented secondary sump 18 via conduits 84 and 86, 88 and 90, and 92 and 94, respectively. The venting proceeds for valve 46 via pick-up 95, conduit 84, opening 96, passageway 82, tunnel 97 and conduit 86 to the sump. For valve 48, the venting proceeds from pick-up 98 via conduit 88, opening 96, passageway 82, tunnel 97, conduit 90 and conduit 86 to the sump. The venting for valve 50 proceeds from pick-up 101 via conduit 92, opening 96, passageway 82, tunnel 97, and conduits 94 and 86 to the sump. This venting is necessary to enable the primary reservoir to maintain an adequate supply of fluid by venting the pocket of air associated with one of the three pick-ups 95, 98 and 101 to the vented sump. Without the vent feature, and with the characteristics of the pumps 34, 36 and 38, the primary reservoir would eventually contain no fluid and a large volume of air. It will be noted that the pick-ups are at a spaced-apart regions of the reservoir so that irrespective of the rotation of the frame 19 to which the reservoir is attached, at least one of the pick-ups is directing air trapped in the reservoir to the sump. Other equivalent means can be provided for communicating the pick-ups 95, 98 and 101 with the conduit 86. For example, the tunnel 97 and the conduits 86, 90 and 94 can be eliminated and the passageway 82, instead of being an annular groove as illustrated can be replaced by a tap leading into the well 69. Then the conduit 76 will serve to complete the venting to the sump. Means to prevent rotation of the spool 60 in the bore 62 are required in such an embodiment.

As previously mentioned, in operation the frame 19 may be rotated at any angle so as to perform necessary work. Accordingly, at least one of the pick-ups 95, 98 and 101 in the primary reservoir 16, and at least one of the pick-ups 41, 43 and 45 in the sump 18 will not be covered by fluid, thus creating a condition wherein at least one of the pumps 34, 36 and 38 is primarily pumping air. The conduits 77, 78 and 80, which return fluid to the primary reservoir from one or more of the holes 65, terminate within the reservoir at conduit ends 104, 105 and 106, respectively, the geometric position of the conduit ends 104, 105 and 106 within the primary reservoir corresponding respectively geometrically to the positions of the pick-ups 41, 43 and 45 respectively within the sump. The pick-ups 95, 98 and 101 are located at regions in the reservoir, generally maximally removed respectively from the conduit ends 104, 105 and 106. In this manner it is assured that when one of the valves 46, 48 and 50 is open to communicate fluid to the primary reservoir, then that valve will also vent a portion of the primary reservoir which contains a pocket of air therein.

Although the invention has been described with respect to a specific embodiment, it is apparent that modifications and variations are possible within the spirit of the inventive concepts. No limitations are intended except by the scope of the appended claims.

What is claimed is:

1. A lubricating system including means for reducing the amount of air contamination therein, comprising:
    a non-vented primary reservoir;
    a vented sump adapted to receive fluid pumped from said reservoir;
    a frame to which said reservoir and said sump are affixed in rigidly-fixed relationship to one another;
    a plurality of valves, each of which comprises a body including a bore longitudinally therethrough ending in a seat adjacent one end thereof, a port communicating the other end of said bore with the exterior of said body, a hole through said body communicating with said bore intermediate said port and said seat, a fluid-flow entrance communicating with said seat, an opening therethrough communicating with said bore intermediate said port and said hole, and a fluid-flow entrance communicating with said seat;
    a poppet-type spool slidably disposed in said bore, one end of said spool being adapted to sit against said seat, said spool including a restricted orifice communicating said one end thereof with said bore and a passageway therein intermediate the end thereof; and means for biasing said one end of said spool to sit against said seat;

said entrance being adapted to receive fluid flow including entrapped air from said sump and direct said flow against said one end of said spool in opposition to the force exerted by said biasing means, said orifice being adapted to conduct air and fluid therethrough into said bore and out of said port and therefrom to said reservoir when said spool is not displaced against the force exerted by said biasing means sufficiently to allow said fluid to flow along said bore and out said hole, said hole being adapted to conduct said fluid therethrough when said spool is displaced by the force of said flow acting against the force of said biasing means sufficiently to allow said fluid to flow along said bore and out said hole and therefrom to said reservoir, said passageway being adapted to communicate said opening with said sump when said spool is displaced against the force exerted by said biasing means sufficiently to allow said fluid to flow out said hole whereby air entrapped in said reservoir escapes therefrom via said opening and said passageway and into said sump;

a port-sump communicating conduit;
a reservoir-opening communicating conduit;
a hole-reservoir communicating conduit; and
a sump-entrance communicating conduit;

each of said sump-entrance conduits of said valves terminating at spaced-apart regions of said sump and each of said reservoir-opening conduits of said valves terminating at spaced-apart regions of said reservoir so that irrespective of the rotation of said frame at least one of said valves is directing fluid flow from said sump to said reservoir and directing air entrapped in said reservoir to said sump.

2. A system as in claim 1, further characterized in that for each valve the reservoir-opening conduit thereof terminates at a position of said reservoir generally maximally removed from the position of termination of the hole-reservoir conduit thereof at said reservoir.

* * * * *